(12) United States Patent
Ryu et al.

(10) Patent No.: US 10,687,198 B2
(45) Date of Patent: Jun. 16, 2020

(54) RELAY COMMUNICATION METHOD OF COMMUNICATION UE AND COMMUNICATION UE THEREOF

(71) Applicants: Samsung Electronics Co., Ltd., Gyeonggi-do (KR); Research & Business Foundation Sungkyunkwan University, Suwon-si (KR)

(72) Inventors: Hyunseok Ryu, Yongin-si (KR); Min Young Chung, Seoul (KR); Won Jin Lee, Changwon-si (KR); Jun Suk Kim, Siheung-si (KR); Min Jang, Seongnam-si (KR); Wonjun Hwang, Suwon-si (KR)

(73) Assignees: Samsung Electronics Co., Ltd., Suwon-si (KR); Research & Business Foundation Sungkyunkwan University, Suwon-si (KR)

( * ) Notice: Subject to any disclaimer, the term of this patent is extended or adjusted under 35 U.S.C. 154(b) by 62 days.

(21) Appl. No.: 15/625,859

(22) Filed: Jun. 16, 2017

(65) Prior Publication Data
US 2017/0366958 A1   Dec. 21, 2017

(30) Foreign Application Priority Data
Jun. 16, 2016  (KR) .......................... 10-2016-0075100

(51) Int. Cl.
*H04W 88/04* (2009.01)
*H04W 8/00* (2009.01)
(Continued)

(52) U.S. Cl.
CPC ........... *H04W 8/005* (2013.01); *H04W 48/10* (2013.01); *H04W 48/14* (2013.01); *H04W 88/04* (2013.01)

(58) Field of Classification Search
None
See application file for complete search history.

(56) References Cited

U.S. PATENT DOCUMENTS

2007/0195799 A1*  8/2007  Kanazawa .............. H04L 45/00
                                                                   370/401
2012/0221702 A1*  8/2012  Umehara ............ H04L 12/1818
                                                                   709/223
(Continued)

FOREIGN PATENT DOCUMENTS

WO          2015/021399 A1     2/2015

OTHER PUBLICATIONS

"3rd Generation Partnership Project; Technical Specification Group Core Network and Terminals; Proximity-services (ProSe) User Equipment (UE) to ProSe function protocol aspects; Stage 3 (Release 13)", 3GPP TS 24.334 V13.2.0 (Dec. 2015), 212 pages.

(Continued)

*Primary Examiner* — Edan Orgad
*Assistant Examiner* — Emmanuel K Maglo

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). According to various embodiments, a relay terminal comprises at least one transicever and at least one processor operativley coupeld to the at least one transicever. The at least one processor is configured to broadcast a search message, receive information for indicating at least one relay terminal of a plurality of relay terminals having transmitted search messages to the remote UE, identify a second relay terminal among the at least one relay terminal, and transmit identification information for the identified second relay terminal to the remote terminal.

20 Claims, 15 Drawing Sheets

(51) Int. Cl.
*H04W 48/14* (2009.01)
*H04W 48/10* (2009.01)

(56) References Cited

U.S. PATENT DOCUMENTS

| | | | |
|---|---|---|---|
| 2013/0331093 A1* | 12/2013 | Cho | H04B 7/14 455/426.1 |
| 2016/0286471 A1* | 9/2016 | Zisimopoulos | H04W 48/16 |
| 2018/0092017 A1* | 3/2018 | Freda | H04W 76/14 |
| 2018/0184436 A1* | 6/2018 | Ohtsuji | H04B 7/15507 |

OTHER PUBLICATIONS

"3rd Generation Partnership Project; Technical Specification Group Services and System Aspects; Policy and charging control architecture (Release 13)", 3GPP TS 23.203 V13.6.0 (Dec. 2015), 242 pages.

"3rd Generation Partnership Project; Technical Specification Group Services and System Aspects; Proximity-based services (ProSe); Stage 2 (Release 13)", 3GPP TS 23.303 V13.1.1 (Sep. 2015), 116 pages.

"3rd Generation Partnership Project; Technical Specification Group Services and System Aspects; Service requirements for the Evolved Packet System (EPS) (Release 13)", 3GPP TS 22.278 V13.2.0 (Dec. 2014), 46 pages.

\* cited by examiner

RELAY COMMUNICATION METHOD OF COMMUNICATION UE AND COMMUNICATION UE THEREOF

CROSS-REFERENCE TO RELATED APPLICATION

The present application is related to and claims priority under 35 U.S.C. § 119(a) to Korean Application Serial No. 10-2016-0075100, which was filed in the Korean Intellectual Property Office on Jun. 16, 2016, the entire content of which is hereby incorporated by reference.

TECHNICAL FIELD

The present disclosure relates to a communication method of a communication UE, and more particularly, to a communication method and apparatus for determining a relay UE.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a Public Safety (PS) environment in which a disaster such as an earthquake, fire, and the like has occurred, some Base Stations (BSs) cannot function and thus particular User Equipments (UEs) cannot communicate. At this time, a relay scheme using a UE within the communication coverage of another BS that can function may be used.

The relay scheme is based on D2D communication. The UE that cannot communicate may transmit data to a relay UE that provides a relay service based on a D2D communication scheme. The relay UE having received the data may transmit a received message to the BS based on a cellular communication scheme.

In this case, when the number of remote UEs that transmit data through the relay UE increases, connections may be concentrated into a particular relay UE and thus a delay of the relay service may occur due to relay overload.

SUMMARY

To address the above-discussed deficiencies, it is a primary object to provide an apparatus and a method for stably operating a communication link between the relay UE and the remote UE and providing a relay service.

Particularly, the aspect of the present disclosure is to provide an apparatus and a method for preventing in advance a bottleneck phenomenon which may occur due to concentration of a plurality of remote UEs in one relay UE.

Further, another aspect of the present disclosure is to provide an apparatus and a method for reducing a time for communication link establishment between the relay UE and the remote UE and preventing the remote UE from being isolated within the system.

Technical problems to be solved by the present disclosure are not limited to the above-described technical problems, and other technical problems that have not been mentioned can be clearly understood by those skilled in the art from the following description.

According to various embodiments, a remote terminal comprises at least one transicever and at least one processor operativley coupeld to the at least one transicever. The at least one processor is configured to receive a plurality of search messages from a plurality of relay terminals, identify at least one relay terminal among the plurality of relay terminals based on the received search messages, transmit information for indicating the identified at least one relay terminal to a first relay terminal of the plurality of relay terminals, receiv identification information for a second relay terminal from the first relay terminal, and perform relay communication with the second relay terminal.

According to various embodiments, a relay terminal comprises at least one transicever and at least one processor operativley coupeld to the at least one transicever. The at least one processor is configured to broadcast a search message, receive information for indicating at least one relay terminal of a plurality of relay terminals having transmitted search messages to the remote UE, identify a second relay terminal among the at least one relay terminal, and transmit identification information for the identified second relay terminal to the remote terminal.

According to various embodiments, a method for operating a remote terminal comprises receiving a plurality of search messages from a plurality of relay terminals, identifying at least one relay terminal among the plurality of relay terminals based on the received search messages, transmitting information for indicating the identified at least one relay terminal to a first relay terminal of the plurality of relay terminals, receiving identification information for a second relay terminal from the first relay terminal, and performing relay communication with the second relay terminal.

According to various embodiments, a method for operating a relay terminal, the method comprises broadcasting a search message, receiving information for indicating at least one relay terminal of a plurality of relay terminals having transmitted search messages to the remote terminal, identifying a second relay terminal among the at least one relay terminal, and transmitting identification information for the identified second relay terminal to the remote terminal.

According to the present disclosure, it is possible to stably operate a communication link between the relay UE and the remote UE and to provide a relay service.

That is, communication quality deterioration which may occur due to concentration of a plurality of remote UEs into one relay UE can be prevented in advance.

Further, the relay UE broadcasts a search message only when the search message is necessary, thereby reducing unnecessary overhead within the system and thus minimizing consumption of a battery of the relay UE.

Furthermore, a time for link establishment between the relay UE and the remote UE can be reduced.

In addition, isolation of a particular remote UE within the system can be prevented.

Effects which can be acquired by the present disclosure are not limited to the above described effects, and other effects that have not been mentioned may be clearly understood by those skilled in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
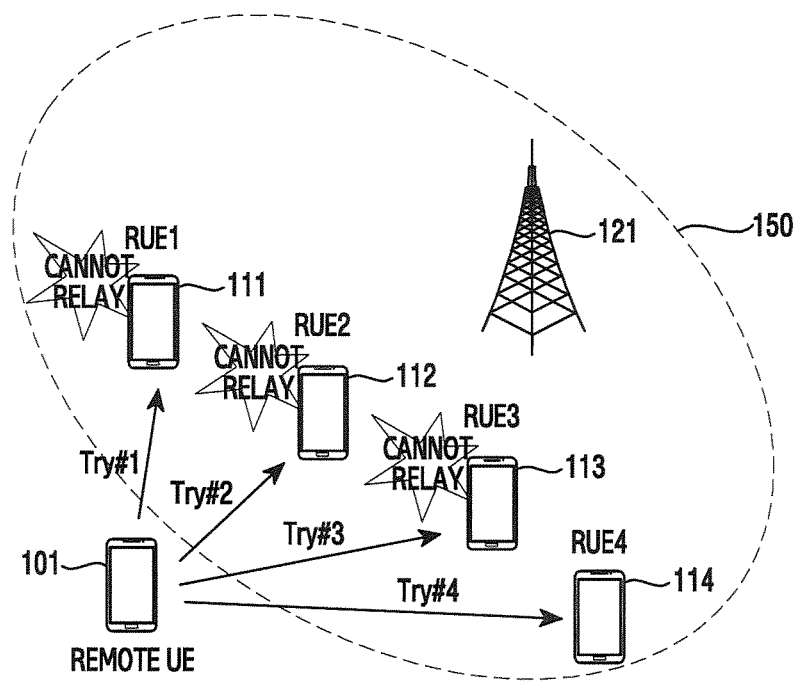
FIGS. 1A and 1B illustrate an environment of a wireless communication system.

FIGS. 1A through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure will be described in detail with reference to the accompanying drawings. In the following description of the present disclosure, a detailed description of known configurations or functions incorporated herein will be omitted when it is determined that the detailed description may make the subject matter of the present disclosure unclear. The terms as described below are defined in consideration of the functions in the embodiments, and the meaning of the terms may vary according to the intention of a user or operator, convention, or the like. Therefore, the definitions of the terms should be made based on the contents throughout the specification.

Prior to the detailed description of the present disclosure, an example of interpretable meanings of some term's used in the present disclosure is proposed. However, it is noted that the terms are not limited to the examples of the construable meanings which are proposed below.

A base station is a subject communicating with a User Equipment (UE), and may be referred to as a BS, a NodeB (NB), an eNodeB (eNB), an Access Point (AP) or the like.

A user equipment (or communication user equipment) is a subject communicating with the BS or another user equipment, and may be referred to as a node, a UE, a Mobile Station (MS), a Mobile Equipment (ME), a device, a terminal or the like.

A relay UE may be a UE that provides a relay service to a UE located outside the coverage of the BS.

A remote UE may be a UE that communicates with the BS through a relay service provided by the relay UE. The remote UE using the relay service may perform Device to Device (D2D) communication with the relay UE, and the relay UE performs cellular communication with the BS.

Candidate relay UEs may be candidate UEs which may perform the relay service. When the communication UE selects a UE which will perform a relay service among candidate relay UEs, the selected UE may operate as the relay UE and the communication UE may operate as the remote UE.

Further, the remote UE and the relay UE may be referred to as a first UE and a second UE.

In addition, the communication UE that requires the use of the relay service before the relay service is used or performs an advance procedure to use the relay service may be referred to as the remote UE.

Here, a communication link between the relay UE and the remote UE may be referred to as a PC-5 link or a SideLink (SL) link. Further, a communication link between the relay UE and the BS may be referred to as a Uu link or a Wide area network Link (WL). In this case, for convenience of the description, the communication link in a viewpoint of the relay UE may be referred to as the WL link, and the communication link in a viewpoint of the BS may be referred to as Uu link.

Figure 1B:
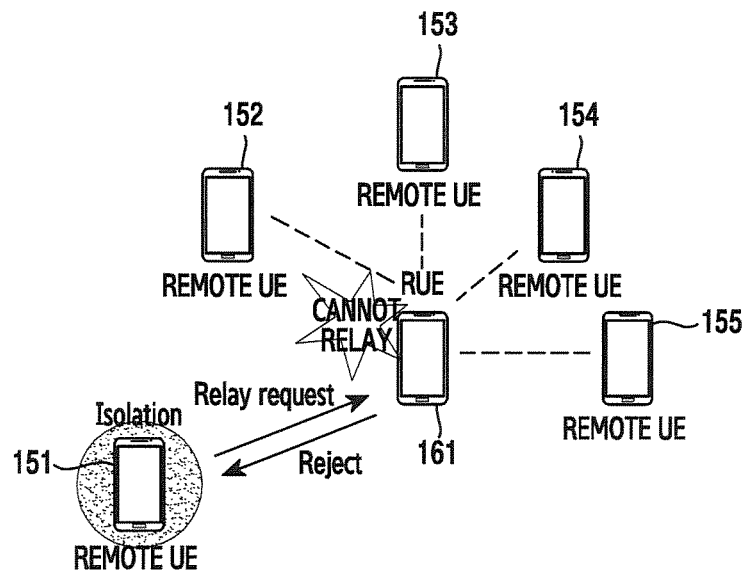

FIGS. 1A and 1B illustrate an environment of a wireless communication system.

In FIGS. 1A and 1B, when there is a lack of available resources of the PC-5 link, the relay UE may reject a request for the relay service from the remote UE to prevent overload.

For example, when a direct communication request message that makes a request for the relay service is received from the remote UE, the relay UE may transmit a direct communication reject message that rejects the relay service request to the remote UE according to a lack of available resources of the PC-5 link.

In FIG. 1A, the wireless communication system environment may include the BS 121, the remote UE 101 located outside the communication coverage 150 of the BS 121, and first to fourth relay UEs 111 to 114 located inside the communication coverage 150 to provide the relay service.

In FIG. 1A, the remote UE 101 located outside the coverage 150 of the BS 121 may first make a request for the relay service to the first to third relay UEs 111 to 113.

In this case, according to the lack of available resources of the PC-5 link, each of the first to third relay UEs 111 to 113 may reject the relay service request from the remote UE 101. Accordingly, the remote UE 101 of which the relay service request is rejected by each of the first to third relay UEs 111 to 113 may make a request for the relay service to the fourth relay UE 114.

In this case, it takes a long time to receive the relay service due to the relay service request and response, and particularly, it may take the remote UE 101 more time to receive the relay service as the number of relay UEs that lack available resources near them increases.

In another example, in FIG. 1B, the wireless communication system environment may include first to fifth remote UEs 151 to 155 and a relay UE 161.

In FIG. 1B, there may be only relay UEs that lack available resources near the first remote UE 151.

For example, the relay UE 161 that lacks available resources may be in a state where the relay UE is providing the relay service to the first to fifth remote UEs 151 to 155.

In this case, when the first remote UE 151 makes a request for the relay service to the relay UE 161, the relay UE 161 may lack available resources and thus cannot help rejecting the request for the relay service.

Accordingly, the first remote UE 151 may fall into an isolation state in which the relay service cannot be received.

Further, in FIGS. 1A and 1B, the relay UE may periodically (for example, every 10 ms) broadcast a search message through a Physical Sidelink Discovery Channel (PSDCH) in order to search for remote UEs.

This may increase general overhead within the wireless communication system and cause consumption of a battery of the relay UE.

Accordingly, the present disclosure discloses a scheme of minimizing a load of the relay UE in each of a search interval in the relay UE searches for the remote UE and a link establishment interval in which the relay UE establishes a link with the remote UE.

Figure 2:
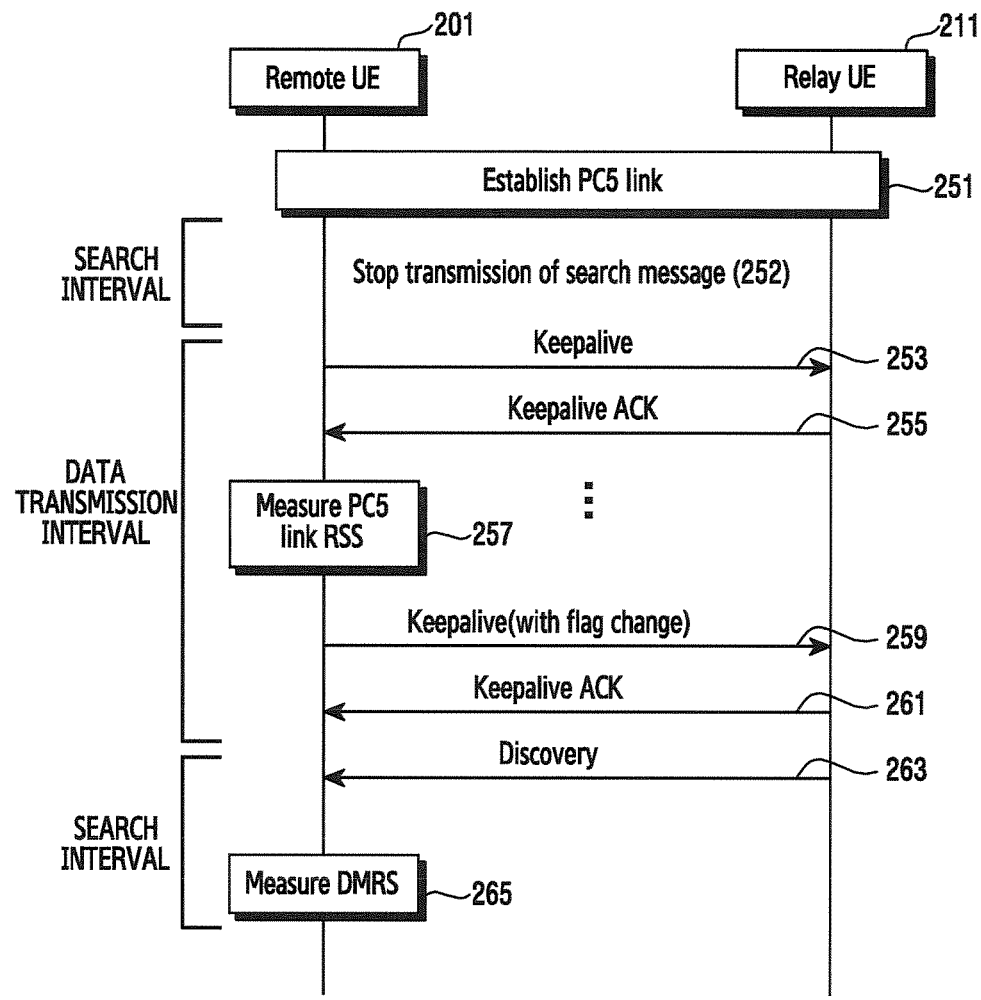
FIG. 2 illustrates a process of controlling a load of a relay UE in a search interval according to an embodiment of the present disclosure.

FIG. 2 illustrates a process of controlling the load of the relay UE in the search interval according to an embodiment of the present disclosure.

A relay UE 211 of FIG. 2 may be in a state where provision of an additional relay service is difficult like the state illustrated in FIG. 1.

In this case, the relay UE 211 may transmit a search message only when there is a request from a remote UE 201 to which the relay UE 211 is currently providing the relay service.

For example, the PC-5 link may have been established between the remote UE 201 and the relay UE 211 (251).

Specifically, when relay UE candidates inform the remote UE 201 of the existence of themselves through the search message, the remote UE 201 may select the relay UE 211 which the remote UE 201 will access among the relay UE candidates and transmit a direct communication request message that makes a request for the relay service to the relay UE 211.

The relay UE 211 having received the direct communication request message may transmit a SidelinkUEInformation message containing PC-5 link information and a Proximity-based service (Prose) UE Identifier (ID) corresponding to a link layer identifier used for direct communication between the relay UE 211 and the remote UE 201 to the BS. Further, the relay UE 211 may transmit an authentication message that allows the relay service to the remote UE 201.

Accordingly, the PC-5 link is established between the remote UE 201 and the relay UE 211 and thus the remote UE 201 and the relay UE 211 may perform direction communication.

Referring back to FIG. 2, the relay UE 211 may stop transmitting the search message in step 252 and block additional access of the remote UE while the PC-5 link is established or direct communication is performed between the remote UE 201 and the relay UE 211.

In this case, the remote UE 201 may transmit a keepalive message to the relay UE 211 in order to continuously grasp whether the relay UE 211 is in an active state in step 253.

When a keepalive ACK message is received from the relay UE 211 in response to the keepalive message in step 255, the remote UE 201 may measure a Received Signal Strength (RSS) of the PC-5 link in step 257.

When the RSS is equal to or lower than a threshold value, the remote UE 201 may make a request for measuring a reference signal to the relay UE 211. For example, the reference signal may be a Demodulation Reference Signal (DMRS) used for demodulating a signal received by the UE or a UE group.

For example, when transmitting the keepalive ACK message to the relay UE 211, the remote UE 201 may make the request for measuring the reference signal by changing a particular flag of the keepalive ACK message in step 259. Specifically, the remote UE 201 may allocate information for the search message request to a spare area of 1 bit of a direct communication keepalive message and transmit the direct communication keepalive message to the relay UE 211.

In response to the direct communication keepalive message, the relay UE 211 may transmit a keepalive ACK message to the remote UE 201 in step 261.

Further, the relay UE 211 may transmit a discovery message including a reference signal to the remote UE in step 263. Accordingly, the remote UE 201 may measure the reference signal (for example, DMRS) from the search message in step 265.

As described above, the relay UE 211 periodically transmits the search message, but provides the search message intermittently only when there is a request from the remote UE 201, thereby reducing unnecessary overhead within the system.

Figure 3:
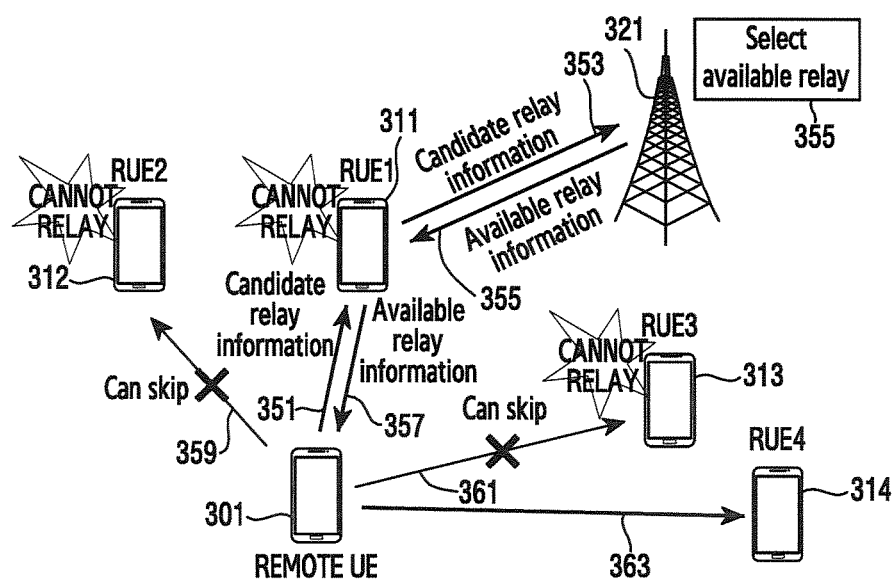
FIG. 3 illustrates a communication system environment in which the load of the relay UE is controlled in a link establishment interval according to an embodiment of the present disclosure.

FIG. 3 illustrates a communication system environment in which the load of the relay UE is controlled in the link establishment interval according to an embodiment of the present disclosure.

In FIG. 3, when the remote UE 301 needs the relay service, the remote UE 301 may make a request for the relay service to a first relay UE 311. In this case, the remote UE 301 may transmit a message containing information on relay UE candidates having transmitted the search message to the remote UE 301 as indicated by reference numeral 351.

Meanwhile, the first relay UE 311 may lack available resources and thus may not provide the relay service anymore. Accordingly, the first relay UE 311 may transmit the message containing the information on the relay UE candidates received from the remote UE 301 to a BS 321 as indicated by reference numeral 353.

The BS 321 may select an available relay UE that may accept an additional remote UE based on the received information on the relay UE candidates as indicated by reference numeral 355. For example, the BS 321 may select the available relay UE based on availability of each of the relay UE candidates. At this time, a detailed method of measuring the availability of each of a plurality of relay UEs will be described in detail through FIGS. 8 to 10.

When the available relay UE is selected, the BS 321 may transmit a message containing information on the selected available relay UE to the first relay UE 311 as indicated by reference numeral 355.

The first relay UE 311 may transmit the received message containing the information on the available relay UE to the remote UE 301 as indicated by reference numeral 357.

When the available relay UE corresponds to the fourth relay UE 314 based on the received information on the available relay UE, the remote UE 301 may make a request for connecting the relay service to the fourth relay UE 314 as indicated by reference numeral 363.

In this case, the remote UE 301 may skip the request for connecting the relay service to the second relay UE 312 and the third relay UE 313 as indicated by reference numerals 359 and 361, and immediately make a request for connecting the relay service to the fourth relay UE 314 indicated by reference numeral 363.

As described above, when the relay UE (for example, the first relay UE 311) assists the link establishment of the remote UE (for example, the remote UE 301), a time for the link establishment of the remote UE may be shortened.

Figure 4:
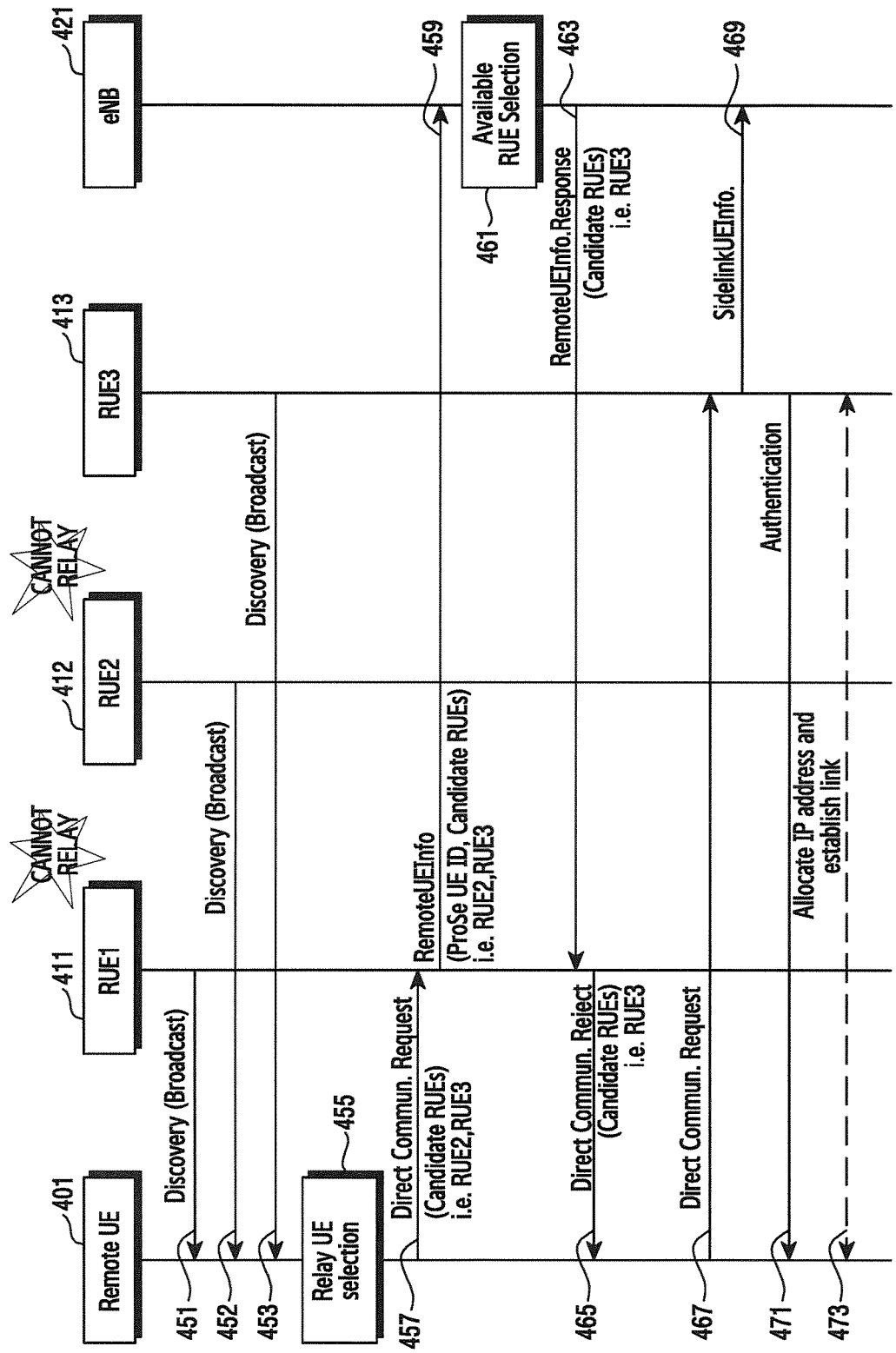
FIG. 4 illustrates a process of controlling the load of the relay UE in the link establishment interval according to an embodiment of the present disclosure.

FIG. 4 illustrates a process of controlling the load of the relay UE in the link establishment interval according to an embodiment of the present disclosure.

FIG. 4 describes the process of FIG. 3 in more detail.

A first relay UE 411 of FIG. 4 may be in a state where provision of an additional relay service is difficult like the state illustrated in FIG. 1A.

In this case, the first relay UE 411 may determine the available relay UE for a remote UE 401 having made a request for the relay service and transmit information on the determined relay UE to the remote UE 401.

For example, first to third relay UEs 411 to 413 may transmit a search message so that the remote UE 401 may receive the search message as in steps 451 to 453.

The remote UE 401 may select the first relay UE 411 as a target relay UE to which the remote UE 401 makes a request for the relay service among the first to third relay UEs 411 to 413 in step 455. For example, the remote UE 401 may select the first relay UE 411 based on priorities of Reference Signal Received Power (RSRP) values provided by the first to third relay UEs 411 to 413.

Next, the remote UE 401 may transmit a direct communication request message containing a list of relay UE candidates having transmitted the search message in steps 451 to 453 to the selected first relay UE 411 in step 457.

In this case, the list of the relay UE candidates may include identification information of the second relay UE 412 and identification information of the third relay UE 413 as identification information of the relay UE candidates. Specifically, the remote UE 401 may allocate identification information of the relay UE candidates and a Prose Relay UE ID of 24 bits for each relay candidate UE to a spare area of the direction communication request message, and transmit the direction communication request message to the first relay UE 411.

Meanwhile, the first relay UE 411 having received the direct communication request message may lack available resources and thus may not provide the relay service.

Accordingly, the first relay UE 411 may determine an available relay UE which can provide the relay service to the remote UE 401 based on the received list of the relay UE candidates.

To this end, the first relay UE 411 may transmit a RemoteUEInfo message containing the relay candidate list and the ProSe UE ID received from the remote UE 401 to a BS 421 in step 459. In this case, the list of the relay UE candidates may include identification information of the second relay UE 412 and identification information of the third relay UE 413 as identification information of the relay UE candidates.

The BS 421 may select the available relay UE based on the received relay candidate list in step 461. For example, the BS 421 may select the available relay UE based on availability of each of a plurality of relay UEs included in the relay candidate list in step 461.

Here, a detailed method of measuring the availability of each of the plurality of relay UEs will be described below in detail through embodiments of FIGS. 8 to 10.

When the third relay UE 413 is selected as the available relay UE, the BS 421 may transmit a RemoteUEInfo response message containing identification information of the available relay UE to the first relay UE 411 in step 463.

The first relay UE 411 may transmit the received identification information of the available relay UE to the remote UE 401. At this time, the first relay UE 411 may insert the identification information of the available relay UE into a direct communication reject message indicating that the first relay UE 411 cannot perform the relay service and transmit the direct communication reject message to the remote UE 401 in step 465.

Specifically, the first relay UE 411 may allocate identification information of the available relay UE and a Prose Relay UE ID of 24 bits of the available relay UE to a spare area of the direction communication reject message, and transmit the direction communication reject message to the remote UE 401.

The remote UE 401 having received the direct communication reject message from the first relay UE 411 may transmit a direct communication request message that makes a request for the relay service to the third relay UE 413 corresponding to the available relay UE again in step 467.

The third relay UE 413 having received the relay service request message may transmit a SidelinkUEInformation message to the BS 421 in step 469. Further, the third relay UE 413 may transmit an authentication message that allows the relay service to the remote UE 401 in step 471.

Accordingly, the third relay UE 413 may allocate an Internet Protocol (IP) address for the remote UE 401, and the PC-5 link may be established between the remote UE 401 and the third relay UE 413 in step 473.

Figure 5:
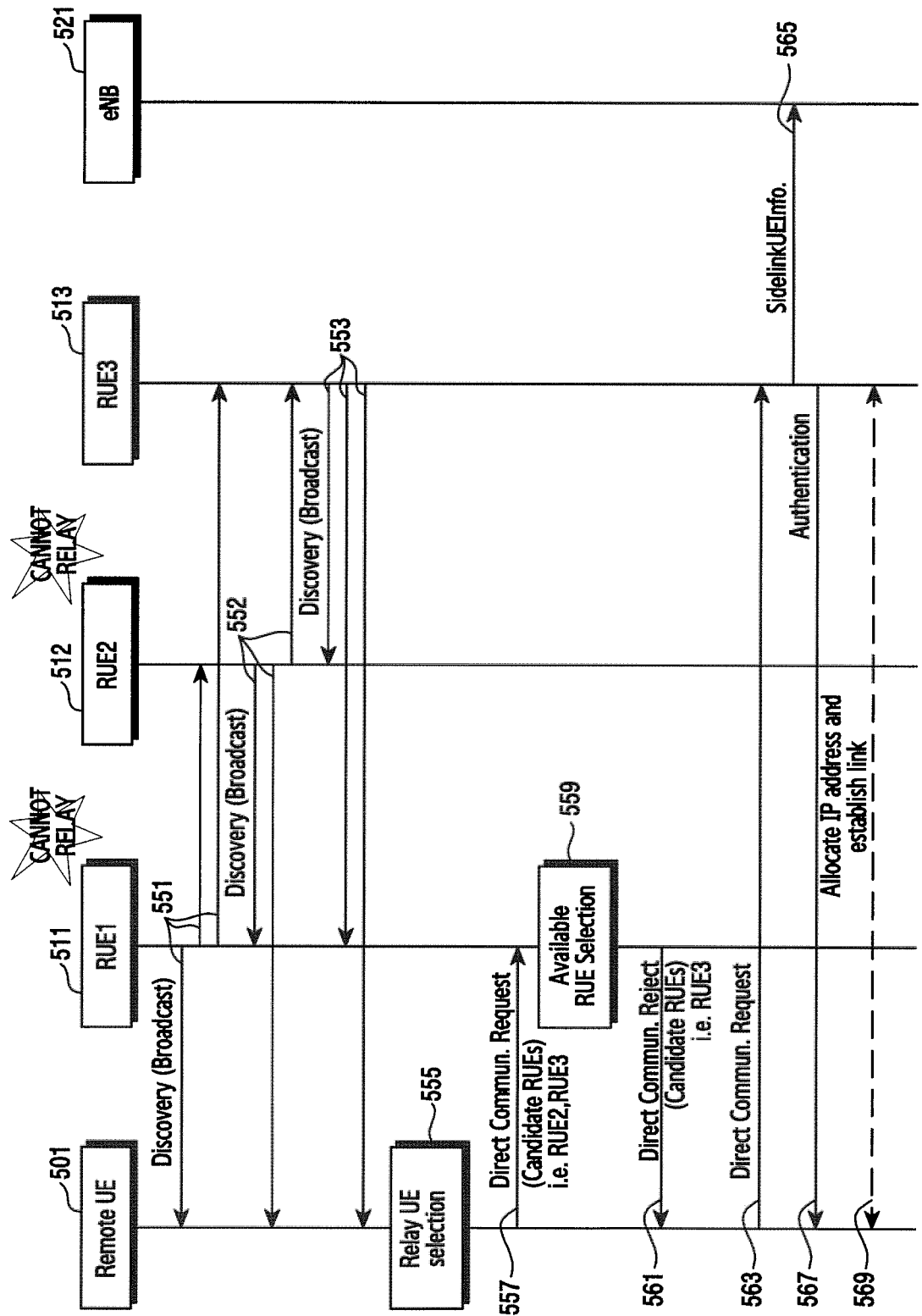
FIG. 5 illustrates a process of controlling the load of the relay UE in the link establishment interval according to another embodiment of the present disclosure.

FIG. 5 illustrates a process of controlling the load of the relay UE in the link establishment interval according to another embodiment of the present disclosure.

A first relay UE 511 of FIG. 5 may be in a state where provision of an additional relay service is difficult like the state illustrated in FIG. 1A.

In FIG. 5, the first relay UE 511 may broadcast a search message so that second and third relay UEs 512 and 513 and a remote UE 501 may receive the search message in step 551. The second relay UE 512 may broadcast the search message so that the first and third relay UEs 511 and 513 and the remote UE 501 may receive the search message in step 552. The third relay UE 513 may broadcast the search message so that the first and second relay UEs 511 and 512 and the remote UE 501 may receive the search message in step 553.

In this case, the search messages broadcasted by the first to third relay UEs 511 to 513 may include information on their availabilities. A detailed method by which the first to third relay UEs 511 to 513 measures their own availabilities will be described below in detail through embodiments of FIGS. 8 to 10.

Meanwhile, the remote UE 501 having received the search message may select the first relay UE 511 as a target relay UE to which the remote UE 501 makes a request for the relay service among the first to third relay UEs 511 to 513 in step 555.

Next, the remote UE 501 may transmit a direct communication request message containing a relay UE candidate list to the selected first relay UE 511 in step 557. The relay UE candidate list may include identification information of the second relay UE 512 and identification information of the third relay UE 513 as identification information of relay UE candidates.

The first relay UE 511 having received the direct communication request message may lack available resources and thus may not provide the relay service.

Accordingly, the first relay UE 511 may determine an available relay UE which can provide the relay service to the remote UE 501 based on the received list of the relay UE candidates.

For example, the first relay UE 511 may acquire availability of each of a plurality of relay UEs included in the relay UE candidate list. The availability may be acquired from the search messages received in steps 552 and 553.

The first relay UE 511 may select the third relay UE 513 as an available relay UE based on availability of each of the plurality of relay UEs in step 559.

Next, when the first relay UE 511 transmits identification information of the available relay UE to the remote UE 501, relay communication may be performed between the remote UE 501 and the third relay UE 513.

Since steps 561 to 569 of FIG. 5 related thereto correspond to steps 465 to 473 of FIG. 4, the overlapping description will be omitted.

Figure 6:
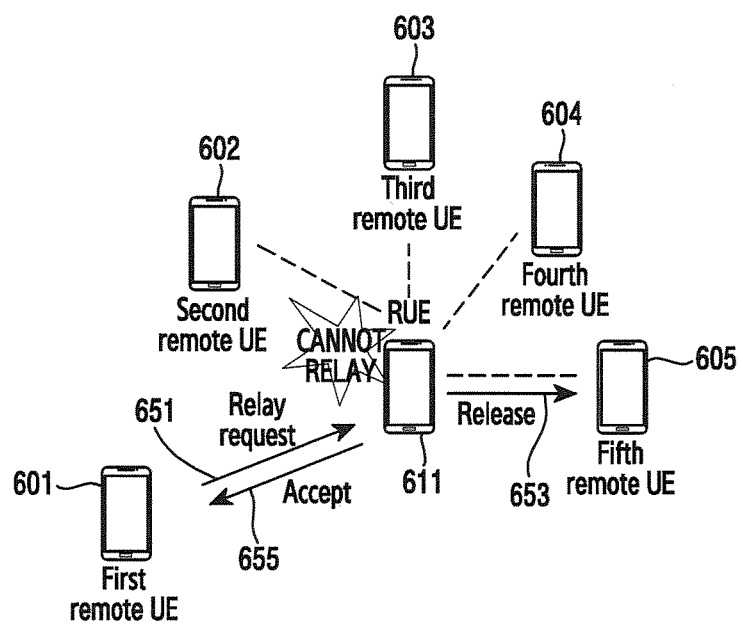
FIG. 6 illustrates a communication system environment in which the load of the relay UE is controlled in the link establishment interval according to another embodiment of the present disclosure.

FIG. 6 illustrates a communication system environment in which the load of the relay UE is controlled in the link establishment interval according to another embodiment of the present disclosure.

In FIG. 6, there are relay UEs which lack available resources around a first remote UE 601, and thus the first remote UE 601 is likely to fall into an isolation state.

In such a situation, the first remote UE 601 may make a request for the relay service to a relay UE 611 as indicated by reference numeral 651.

In this case, when it is determined that a relay UE candidate list of a relay service request message is empty, the relay UE 611 may select a UE of which a link connection is to be released based on relay UE candidate lists transmitted by second to fifth remote UEs 602 to 605.

When the fifth remote UE 605 is selected as the UE of which the communication connection is to be released, the relay UE 611 may make a request for releasing the communication connection to the fifth remote UE 605 as indicated by reference numeral 653.

Further, the relay UE 611 may accept provision of the relay service for the first remote UE 601 which is likely to fall into the isolation state as indicated by reference numeral 655.

Figure 7:
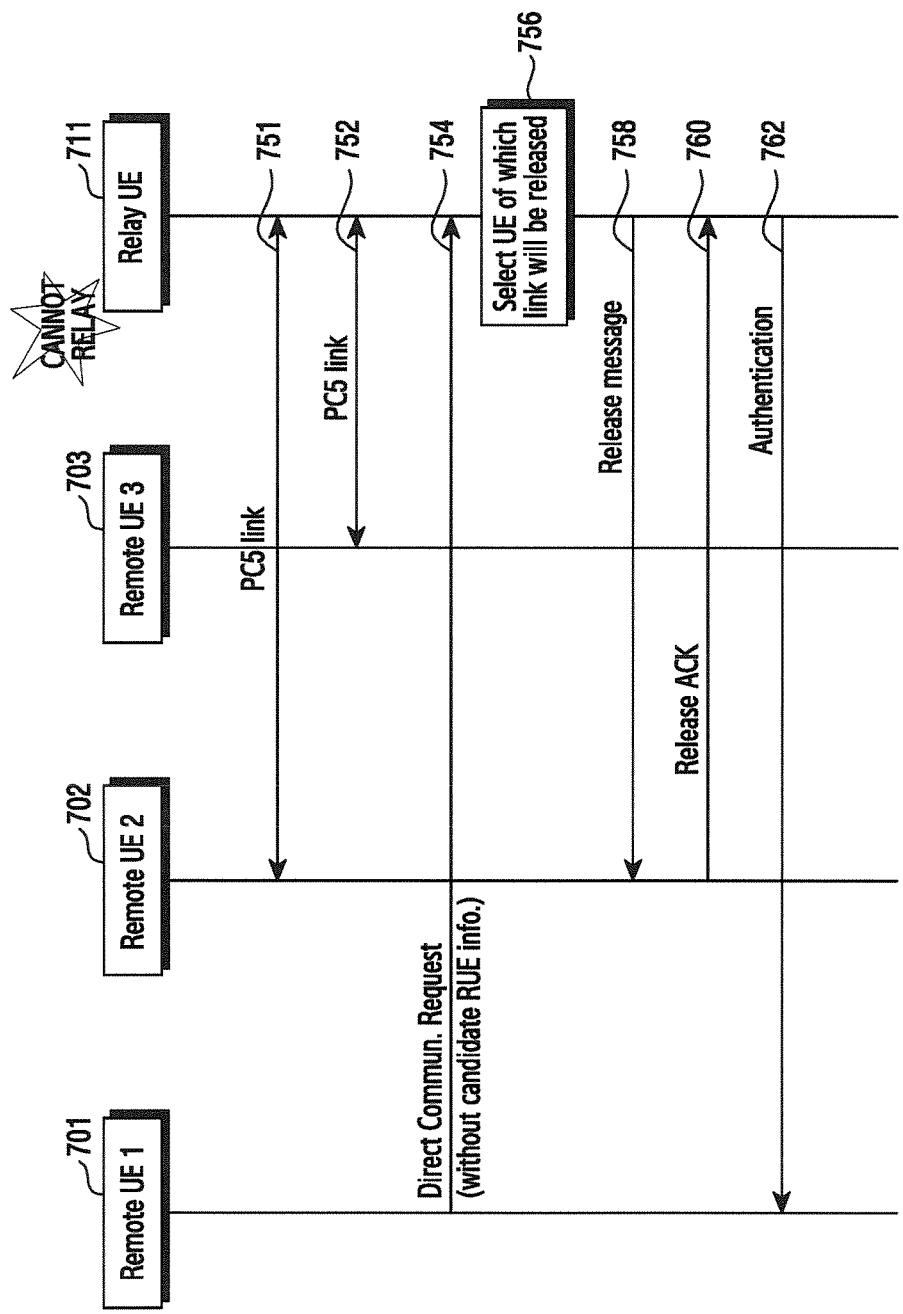
FIG. 7 illustrates a process of controlling the load of the relay UE in the link establishment interval according to another embodiment of the present disclosure.

FIG. 7 illustrates a process of controlling the load of the relay UE in the link establishment interval according to another embodiment of the present disclosure.

FIG. 7 describes the process of FIG. 6 in more detail.

In FIG. 7, there may be only relay UEs which lack available resources around the remote UE like in the state illustrated in FIG. 1B.

In this case, when there is no identification information of the relay UE in a relay UE candidate list received from a first remote UE 701, a relay UE 711 may accept the first remote UE 701 without conditions and prevent the first remote UE 701 from falling into the isolation state.

For example, the PC-5 links may have been already formed between the relay UE 711 and a second remote UE 702 and between the relay UE 711 and a third remote UE 703 in steps 751 and 752.

In this case, the first remote UE 701 may transmit a direct communication request message containing a relay UE candidate list to the relay UE 711 in order to make a request for the relay service in step 754.

When the relay UE candidate list contains no identification information of the relay UE, the relay UE 711 having received the direct communication request message may determine that the first remote UE 701 is likely to fall into the isolation state.

Accordingly, the relay UE 711 may select a UE of which a link connection is to be released based on a plurality of relay candidate lists received from the second and third remote UEs 702 and 703 for which the PC-5 links have been already formed in step 756.

For example, the relay UE 711 may select the remote UE having transmitted the relay UE candidate list containing identification information of another relay UE candidate as the UE of which the link connection is to be released.

In this case, when the number of UEs of which link connections are to be released is plural, the relay UE 711 may determine a final UE of which the link connection is to be released in consideration of the load (for example, remaining buffer state) of each of the UEs of which the connections are to be released and a battery state.

When the second remote UE 702 is selected as the UE of which the link connection is to be released, the relay UE 711 may transmit a communication connection release message to the second remote UE 702 in step 758.

The second remote UE 702 may transmit a release response message to the relay UE 711 in step 760.

As described above, when the communication connection between the relay UE 711 and the second remote LTE 702 is released, the relay UE 711 may transmit an authentication message that allows the relay service to the first remote UE 701 which is likely to fall into the isolation state in step 762.

Accordingly, a direction communication connection may be established between the relay UE 711 and the first remote UE 701, and thus the PC-5 link load of the relay UE 711 may be properly controlled.

Hereinafter, FIGS. 8 to 10 correspond to embodiments of measuring availability of the relay UE.

Figure 8:
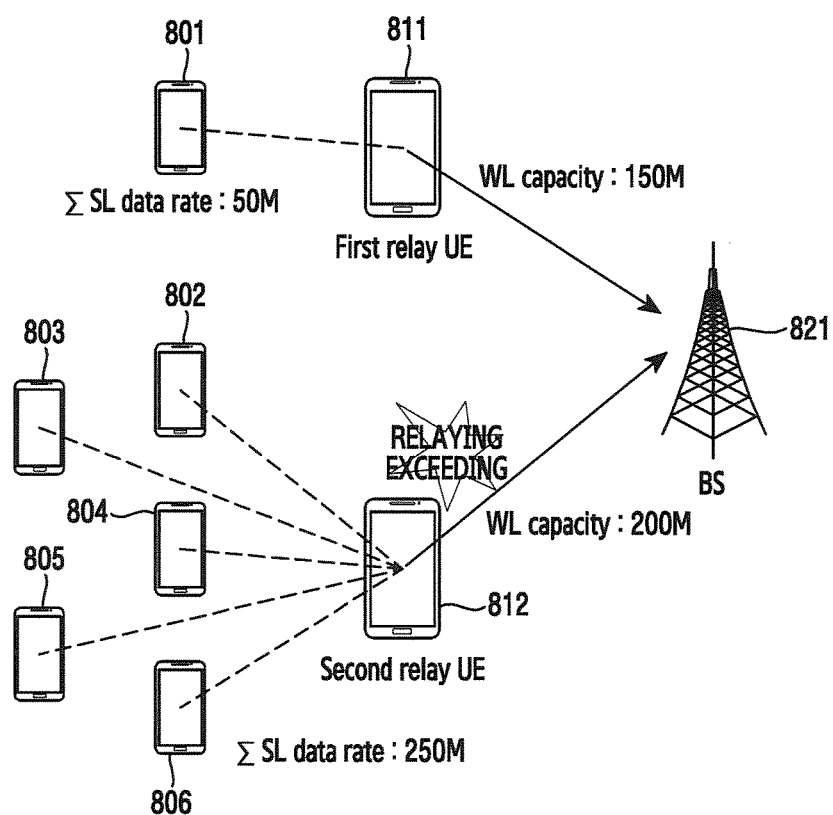
FIGS. 8 to 10 illustrate embodiments for measuring availability of the relay UE.
Figure 9:
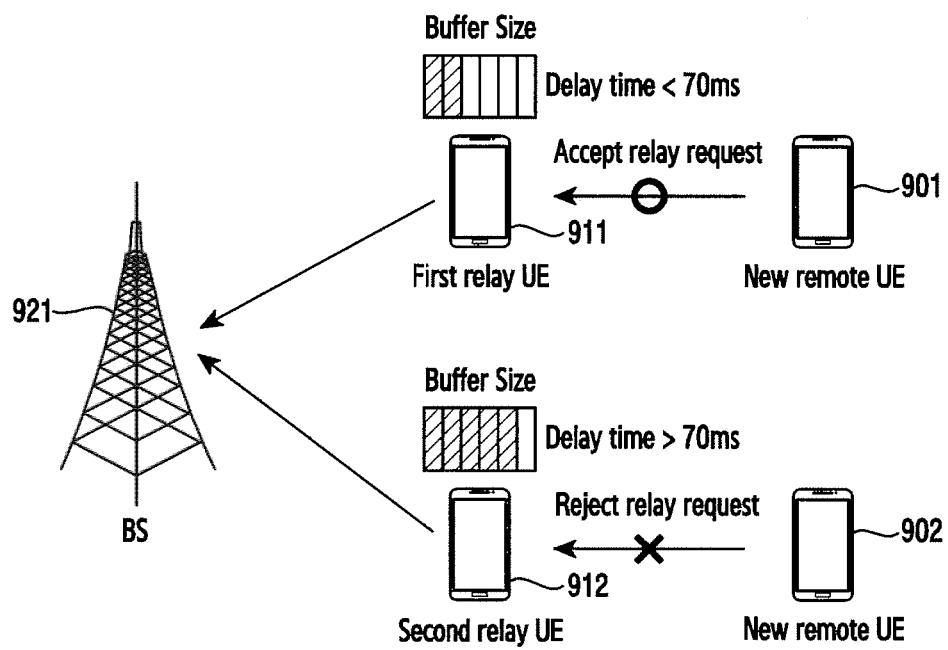
Figure 10:
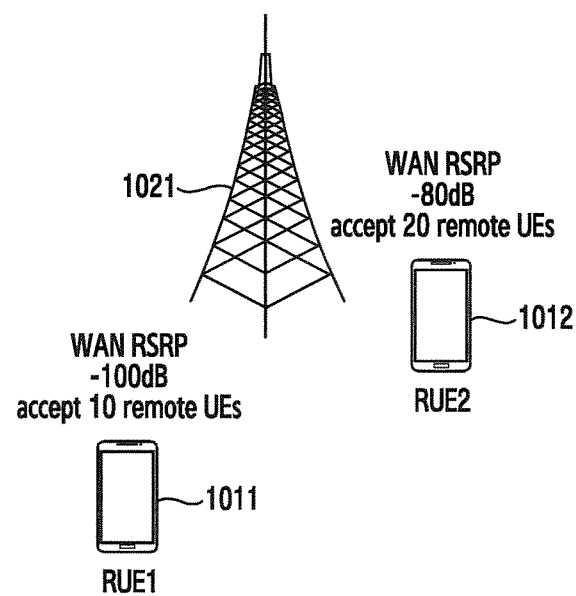

In FIGS. 8 to 10, relay UEs having received the relay service request message from the remote UE may measure their own link availabilities. Further, the relay UEs may transmit the measured availabilities to the BS or another relay UE.

The BS or the relay UE may determine an available relay UE based on the availabilities received from a plurality of relay UEs.

In another example, the relay UEs having received the relay service request message from the remote UE may measure their own link availabilities through the following embodiments. Further, the relay UEs may determine whether to reject or accept the relay service request based on the measured availabilities.

In an embodiment, the relay UE may measure its own availability based on an amount of available data in the WL and an average data transmission yield in the SL in FIG. 8.

In FIG. 8, when a first relay UE 811 and a first remote UE 801 are only connected to each other, the amount of available data in the WL may be 150 M, and the average data transmission yield in the SL may be measured as 50 M. Further, when second to sixth remote UEs 802 to 806 are connected to a second relay UE 812, the amount of available data in the WL may be 200 M and the average data transmission yield in the SL may be measured as 250 M.

In this case, the availability of each of the first relay UE 811 and the second relay UE 812 may be determined based on a difference between the amount of available data that can be transmitted through the WL and the average data transmission yield through SL.

Equations (1) and (2) below show examples of detailed equations for measuring availability of the relay UE.

$$\alpha = \max\left[\frac{C_{UL} - \sum_i r_{SL_{u,i}}}{C_{UL}}, 0\right]$$ Equation (1)

$$\beta = \max\left[\frac{C_{DL} - \sum_i r_{SL_{d,i}}}{C_{DL}}, 0\right]$$ Equation (2)

In Equations (1) and (2), $C_{UL}$ denotes a maximum amount of data which can be transmitted through an Uplink (UL) and $C_{DL}$ denotes an maximum amount of data which can be transmitted through a Downlink (DL).

Further, $r_{SL_{u,i}}$ denotes an average data transmission yield from a remote UE i to the relay UE through the SL.

$r_{SL_{d,i}}$ denotes an average data transmission yield from the relay UE to the remote UE i through the SL.

In this case, uplink availability $\alpha$ and downlink availability $\beta$ may be calculated based on a difference between the amount of available data which can be transmitted through the WL and the average data transmission yield through the SL.

Based on the equations, the relay UE may determine that available capacity of its own link is lacking (or a bottleneck phenomenon is serious) as the availabilities $\alpha$ and $\beta$ are smaller, and the available capacity of its own link is sufficient as the availabilities $\alpha$ and $\beta$ are larger.

For example, when the relay UE accepts a relay service request from a new remote UE and the availabilities $\alpha$ and $\beta$ become 0, the relay UE may reject a connection request from the remote UE.

In another example, the relay UE may transmit each of the measured uplink availability $\alpha$ and downlink availability $\beta$ to a BS 821.

In another example, the relay UE may measure its own availability based on available capacity of a current buffer in FIG. 9.

In this case, the availability of the relay UE may include current availability capacity of the buffer or a delay time.

Specifically, when a transmission delay time up to a time point when the first relay UE 911 transmits additional packet data received from the pre-connected remote UE to the BS is shorter than a threshold value (for example, 70 ms), the first relay UE 911 may determine that the current available buffer capacity is sufficient.

When it is determined that the available capacity is sufficient, the first relay UE 911 may accept a relay service request from a new remote UE 901.

In this case, the first relay UE 911 may transmit the measured available capacity or delay time to a BS 921.

Meanwhile, when a transmission delay time up to a time point when the second relay UE 912 transmits additional packet data received from the pre-connected remote UE to the BS exceeds the threshold value (for example, 70 ms), the second relay UE 912 may determine that the current available buffer capacity is not sufficient.

When it is determined that the available capacity is insufficient, the second relay UE 912 may reject the relay service request from the new remote UE 902.

In this case, the second relay UE 912 may transmit the measured available capacity or delay time to the BS 921.

Here, a threshold value (for example, 70 ms) which is the reference of the delay time may follow a threshold value defined as a transmission delay time of Mission Critical Voice over Internet Protocol (VoIP) packet transmission of Public Safety in the TS 23.203 standard.

In another embodiment, the relay UE may measure its own availability based on the number of remote UEs which can receive the relay service in FIG. 10.

In this case, the availability of the relay UE may include communication quality of the WL of the relay UE or the number of remote UEs.

The relay UE may predict the number of acceptable remote UEs according to the communication quality of the WL based on a preset table. The preset table may be received from a BS 1021, or may be stored in advance by a manufacturer of the relay UE, an application installed in the relay UE, or a provider of an operating system. Alternatively, the preset table may be designated by a user or a manager through a user interface.

For example, when an RSRP value of communication quality of the WL measured by a first relay UE 1011 is −100 dB, the first relay UE 1011 may determine that relay service requests of 10 remote UEs can be accepted based on the preset table.

In this case, the first relay UE 1011 may transmit the number of acceptable remote UEs to the BS 1021.

In another example, when an RSRP value of communication quality of the WL measured by a second relay UE 1012 is −80 dB, the second relay UE 1012 may determine that relay service requests of 20 remote UEs can be accepted based on the preset table.

In this case, the second relay UE 1012 may transmit the number of acceptable remote UEs to the BS 1021.

In another embodiment, the availability of the relay UE may include an available current residual quantity of a battery of the relay UE.

The relay UE may measure its own battery residual quantity.

The relay UE may transmit information on the measured battery residual quantity (for example, percentage of the residual quantity or operable time of the relay UE) to the BS.

Alternatively, when the battery residual quantity of the relay UE is larger than or equal to a threshold value, the relay UE may accept a relay service request from a new relay UE.

Alternatively, when the battery residual quantity of the relay UE is equal to or smaller than the threshold value, the relay UE may reject the relay service request from the new relay UE.

In this case, the threshold value may be a value broadcasted from the BS and then acquired or preset and then stored.

In another embodiment, the BS may measure availabilities of relay UE candidates and determine an available relay UE based on the measured availabilities. When the available relay UE is determined, the BS may transmit a message containing identification information of the available relay UE to the relay UE.

Alternatively, when the BS receives a message that makes a request for identifying whether the relay UE candidate can perform the relay service from the relay UE candidate, the BS may measure availabilities of the relay UE candidates and transmit a message containing information on whether the relay UE candidate corresponds to an available relay UE or an unavailable relay UE to the relay UE. In this case, 1 bit may be allocated to information indicating a state of the relay UE (available or unavailable).

The BS may determine the available relay UE based on at least one piece of Uu link information and PC-5 link information.

For example, the BS may measure availability of the relay UE based on an amount of available data of the Uu link used by the relay UE and an average data transmission yield in the PC-5 link.

Alternatively, the BS may select the available relay UE based on a difference between a maximum amount of data which can be transmitted by each of the relay UE candidates through a data transmission chance and an amount of data which can be actually transmitted by the relay UE.

Specifically, the maximum amount of data which can be transmitted by each of the relay UE candidates may be measured based on communication quality of the Uu link and an amount of resources allocated to the relay UE. Further, the amount of data which can be actually transmitted by the relay UE may be measured based on available buffer capacity of the relay UE.

In this case, the availability of the relay UE may be determined based on a ratio of the amount of the actually transmitted data to the maximum amount of the data which can be transmitted. For example, when the ratio is equal to or smaller than a threshold value, it means that the amount of the actually transmitted data is smaller than the maximum amount of the data which can be transmitted, and thus the availability of the corresponding relay UE may be estimated to be high.

For example, when the maximum amount of data which can be transmitted by one relay UE is measured as 100 MB based on communication quality of the link between the BS and the one relay UE but the amount of data actually transmitted by the relay UE is 50 MB, the one relay UE may be determined as the relay UE which can additionally accept the remote UE.

Figure 11:
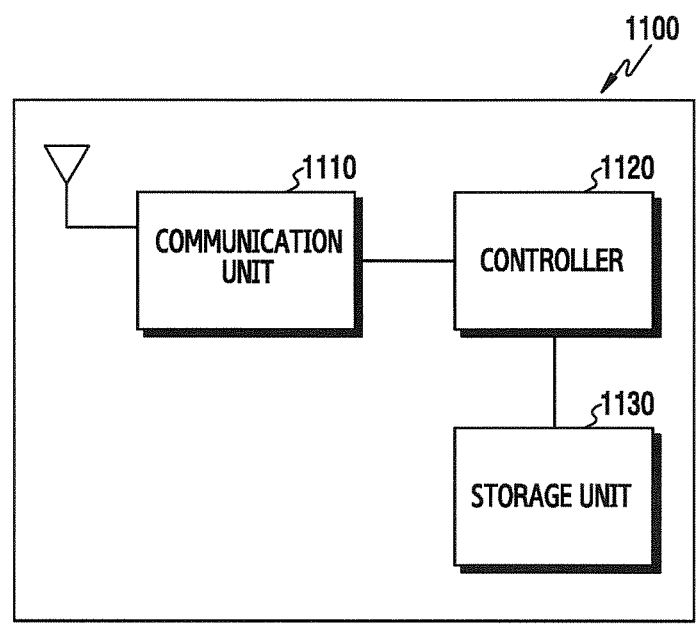
FIG. 11 illustrates a communication UE according to an embodiment of the present disclosure.

FIG. 11 illustrates a communication UE according to an embodiment of the present disclosure.

Referring to FIG. 11, a UE 1100 includes a communication unit 1110, a controller 1120, and a storage unit 1130.

Elements of the UE 1100 may correspond to elements of the communication UE, the remote UE, and the relay UE.

The term "~unit" or "~er" used hereinafter may refer to the unit for processing at least one function or operation and may be implemented in hardware, software, or a combination of hardware and software.

The communication unit 1110 performs functions for receiving a signal through a radio channel. The communication unit 1110 may include a transceiver for transmitting and receiving a signal. For example, the communication unit 1110 may receive a Radio Frequency (RF) signal, convert, demodulate, and decode a frequency, remove a Cyclic Prefix (CP), and perform Fast Fourier Transform (FFT), channel estimation, and equalizing. The communication unit 1110 may additionally perform a function of transmitting a signal processed by the controller 1120 to another node.

The transceiver included in the communication unit 1110 may transmit or receive a signal to or from a BS or another UE.

In an embodiment, when the communication unit 1110 is included in the remote UE, the communication unit 1110 of the remote UE may receive a search message received from the relay UE.

In another embodiment, when the communication unit 1110 is included in the relay UE, the communication unit 1110 of the relay UE may broadcast a search message to the remote UE.

The controller 1120 may control general operations of the UE. For example, the controller 1120 receives a signal through the communication unit 1110. Further, the controller 1120 records data in the storage unit 1130 and reads the data. To this end, the controller 1120 may include at least one processor, microprocessor, or microcontroller, or may be a part of the processor.

According to an embodiment, when the controller 1120 is included in the remote UE and receives a plurality of search messages from a plurality of relay UEs through the communication unit 1110, the controller 1120 may generate a relay UE candidate list including identification information of at least one of the plurality of relay UEs based on the received search messages.

Next, the controller 1120 may transmit the message including the generated relay UE candidate list to one of the plurality of relay UEs through the communication unit 1110.

When a message including identification information of an available UE which can provide a relay service to the remote UE is received through the communication unit 1110 based on a result of the transmission, the controller 1120 may perform relay communication with the available relay UE.

In this case, the available relay UE may be a UE determined based on availability of each of the plurality of relay UEs included in the relay UE candidate list.

At this time, the availability may be determined based on at least one of an amount of data which the relay UE can transmit to the BS through the WL, a transmission yield of transmission from the relay UE to the remote mode through the SL, available buffer capacity of the relay UE, a transmission delay time, the number of remote UEs to which the relay UE can provide a relay service, and a battery residual quantity.

Further, the message including the identification information of the available relay UE received from the relay UE may include a direct communication reject message indicating that one relay UE cannot perform the relay service.

In another embodiment, when the controller 1120 is included in the relay UE and the search messages are broadcasted to the remote UE through the communication unit 1110, the controller 1120 may receive a relay UE candidate list including identification information of the plurality of relay UEs having transmitted the search messages to the remote UE from the remote UE in response to the search messages.

When the relay UE candidate list is received, the controller 1120 may determine an available relay UE which can provide the relay service to the remote UE based on the received relay UE candidate list. Next, the controller 1120 may control the communication unit 1110 to transmit a message including identification information of the determined available relay UE to the remote UE.

In the determination of the available relay UE, when the controller 1120 receives the message including the identification information of the available relay UE from the BS, the controller 1120 may determine the available relay UE based on the received message. At this time, the available relay UE may be a UE selected by the BS based on availability of each of the plurality of relay UEs included in the relay UE candidate list.

Further, when the controller 1120 determines the available relay UE, the controller 1120 may determine the available relay UE based on the availability of each of the plurality of relay UEs included in each of the plurality of search messages received from each of the plurality of relay UEs.

At this time, the availability may be determined based on at least one of an amount of data which the relay UE can transmit to the BS through the WL, a transmission yield of transmission of the relay UE to the remote mode through the SL, available buffer capacity of the relay UE, a transmission delay time, the number of remote UEs to which the relay UE can provide a relay service, and a battery residual quantity.

Further, when the relay UE candidate list is empty, the controller 1120 may control the communication unit 1110 to release a communication connection with another remote UE connected to the relay UE.

In addition, when the number of other remote UEs connected to the relay UE is plural, the controller 1120 may determine a remote UE of which a communication connection will be released based on a plurality of relay UE candidate lists received from the plurality of remote UEs.

In another embodiment, when the controller 1120 is included in the remote UE, the controller 1120 may measure a signal intensity of a direct communication link connected to the relay UE.

When the measured signal intensity is equal or lower than a threshold value, the controller 1120 may control the communication unit 1110 to transmit a message that makes a request for a reference signal to the relay UE.

When the reference signal is generated or acquired by the relay UE, the controller 1120 may receive a search message including the reference signal through the communication unit 1110.

In this case, the reference signal may be a DMRS used for demodulating the signal received by the remote UE.

In another embodiment, when the controller 1120 is included in the relay UE, the controller 1120 may control the communication unit 1110 to stop transmission of the search message while the direction communication is performed with the remote UE.

In this case, when a message that makes a request for the reference signal is received from the remote UE which is performing the direct communication, the relay UE may generate or acquire the reference signal in response to the request message and may transmit the search message including the reference signal to the remote UE.

The storage unit 1130 stores a basic program for the operation of the UE 1100, an application program, and data such as setting information. For example, the storage unit 1130 performs functions for storing data processed by the controller 1120. The storage unit 1130 may include a volatile memory, a non-volatile memory, or a combination of the volatile memory and the non-volatile memory. For example, the storage unit 1130 may include a Random Access Memory (RAM), a flash memory, and the like.

Further, the storage unit 1130 may store a relay UE candidate list. In addition, the storage unit 1130 may store information related to availability of the UE 1100 measured by the controller 1120

In FIG. 11, the UE 1100 includes the communication unit 1110, the controller 1120, and the storage unit 1130. In another embodiment, the UE 1100 may further include an additional element as well as the above described elements.

According to various embodiments, a remote terminal comprises at least one transicever and at least one processor operativley coupeld to the at least one transicever. The at least one processor is configured to receive a plurality of search messages from a plurality of relay terminals, identify at least one relay terminal among the plurality of relay terminals based on the received search messages, transmit information for indicating the identified at least one relay terminal to a first relay terminal of the plurality of relay terminals, receiv identification information for a second relay terminal from the first relay terminal, and perform relay communication with the second relay terminal.

According to various embodiments, the second relay terminal is identified as an available relay terminal which can provide a relay service with the reomote terminal, based on availability of each of the plurality of relay terminals, among the at least one relay terminal.

According to various embodiments, the availability of a relay terminal is determined based on at least one of an amount of data which the relay terminal can transmit to a base station (BS), a transmission yield of transmission from the relay terminal to the remote terminal, an available buffer capacity of the relay terminal, a number of remote terminals to which the relay terminal can provide the relay communication, or a battery residual quantity. The relay terminal is one of the plurality of relay terminals.

According to various embodiments, the at least one processor is further configured to measure signal strengths of the received search messages, respectively, and identify the at least one relay terminal among the plurality of relay terminals according to the measured signal strengths. The identification information for the second relay terminal includes a direct communication reject message indicating that the first relay terminal cannot perform the relay communication.

According to various embodiments, a relay terminal comprises at least one transicever and at least one processor operativley coupeld to the at least one transicever. The at least one processor is configured to broadcast a search message, receive information for indicating at least one relay terminal of a plurality of relay terminals having transmitted search messages to the remote UE, identify a second relay terminal among the at least one relay terminal, and transmit identification information for the identified second relay terminal to the remote terminal.

According to various embodiments, when identifying the second relay terminal, the at least one processor is configured to transmit candidate information for indicating the at least one relay terminal to a base station (BS), and receive the identification information for the second relay terminal from the BS. The second relay terminal is identified by the BS based on availability of each of the plurality of relay terminals.

According to various embodiments, when identifying the second relay terminal, the at least one processor is configured to receive, from the plurality of relay terminals, a plurality of search messages comprising availabilites of the plurality of relay terminals, respectively, and identify the second relay terminal based on the availabilites of the plurality of relay terminals.

According to various embodiments, the availability of a terminal is determined based on at least one of an amount of data which the relay terminal can transmit to the BS, a transmission yield of transmission from the relay terminal to the remote terminal, an available buffer capacity of the relay terminal, a number of remote terminals to which the relay terminal can provide the relay communication, or a battery residual quantity. The relay terminal corresponds to one of the plurality of relay terminals.

According to various embodiments, the at least one relay terminal is identified by the remote terminal based on signal strengths of the search messages transmitted from the plurality of relay terminals.

According to various embodiments, the at least one processor is further configured to determine a remote terminal of which a communication connection will be released based on information for indicating at least one candidate relay terminal received from each of a plurality of remote terminals.

Figure 12:
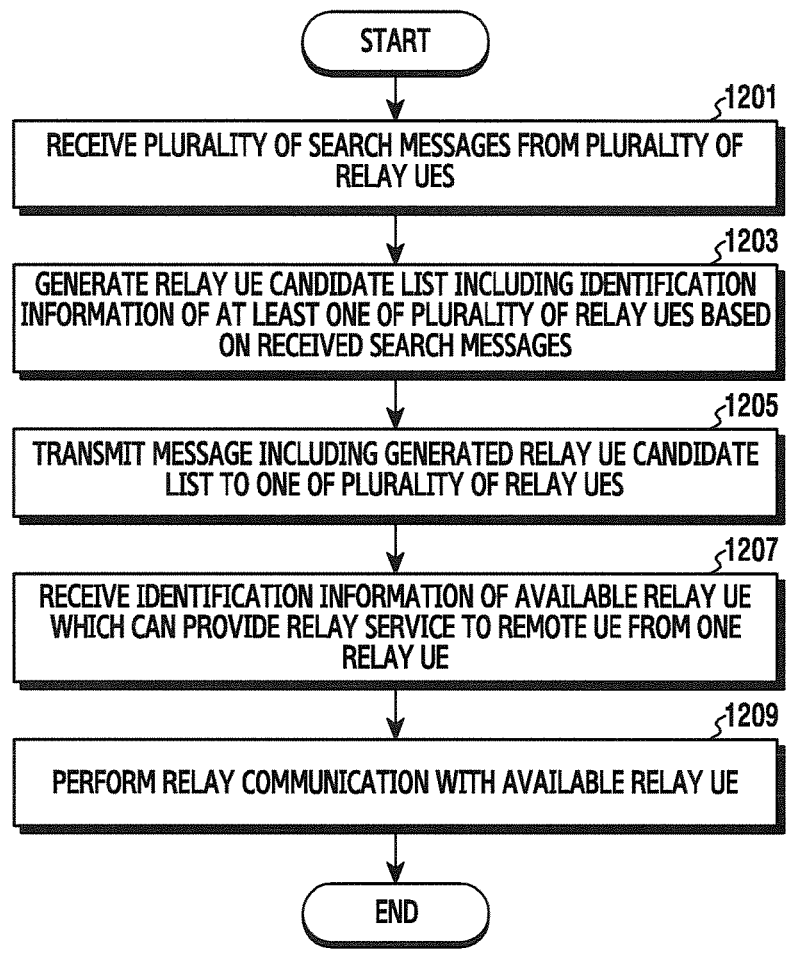
FIG. 12 illustrates the operation of the remote UE according to an embodiment of the present disclosure.

FIG. 12 illustrates the operation of the remote UE according to an embodiment of the present disclosure.

In FIG. 12, the remote UE may receive a plurality of search messages from a plurality relay UEs in step 1201.

The remote UE may generate a relay UE candidate list including identification information of at least of the plurality of relay UEs based on the received search messages in step 1203.

Next, the remote UE may transmit a message including the generated relay UE candidate list to one of the plurality of relay UEs in step 1205.

In response to the message, the remote UE may receive a message including identification information of an available relay UE which can provide a relay service to the remote UE from one relay UE in step 1207. In this case, the message including the identification information of the available relay UE may include a direct communication reject message indicating that the one relay UE cannot perform the relay service.

Based on the received message, the remote UE may perform relay communication with the available relay UE in step 1209.

In this case, the available relay UE may be a UE determined based on availability of each of the plurality of relay UEs included in the relay UE candidate list.

Figure 13:
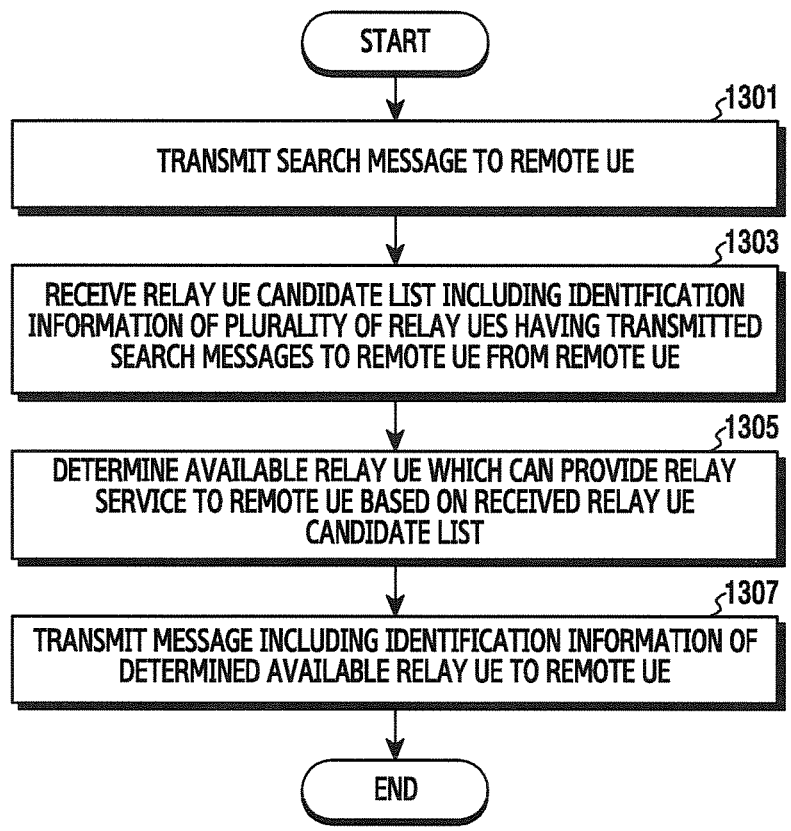
FIG. 13 illustrates the operation of the relay UE according to an embodiment of the present disclosure.

FIG. 13 illustrates the operation of the relay UE according to an embodiment of the present disclosure.

In FIG. 13, the relay UE may broadcast a search message to the remote UE in step 1301.

In response to the transmission of the search message, the relay UE may receive a relay UE candidate list including identification information of a plurality of relay UEs having transmitted search messages to the remote UE from the remote UE in step 1303.

The relay UE may determine an available relay UE which can provide a relay service to the remote mode based on the received relay UE candidate list in step 1305.

For example, in order to determine the available relay UE, the relay UE may transmit the relay UE candidate list to the BS and receive a message including identification information of the available relay UE from the BS. At this time, the available relay UE may be a UE selected by the BS based on availability of each of the plurality of relay UEs included in the relay UE candidate list.

In another example, in order to determine the available relay UE, the relay UE may receive a plurality of search messages from a plurality of relay UEs and determine the available relay UE based on availability of each of the plurality of relay UEs included in the plurality of received search messages.

Next, the relay UE may transmit the message including the identification information of the determined available relay UE to the remote UE in step 1307.

Meanwhile, when the relay UE candidate list is empty, the relay UE may release a communication connection with another remote UE connected to the relay UE. At this time, when the number of other remote UEs connected to the relay UE is plural, the relay UE may determine a remote UE of which the communication connection will be released based on a plurality of relay UE candidate lists received from the plurality of remote UEs.

Figure 14:
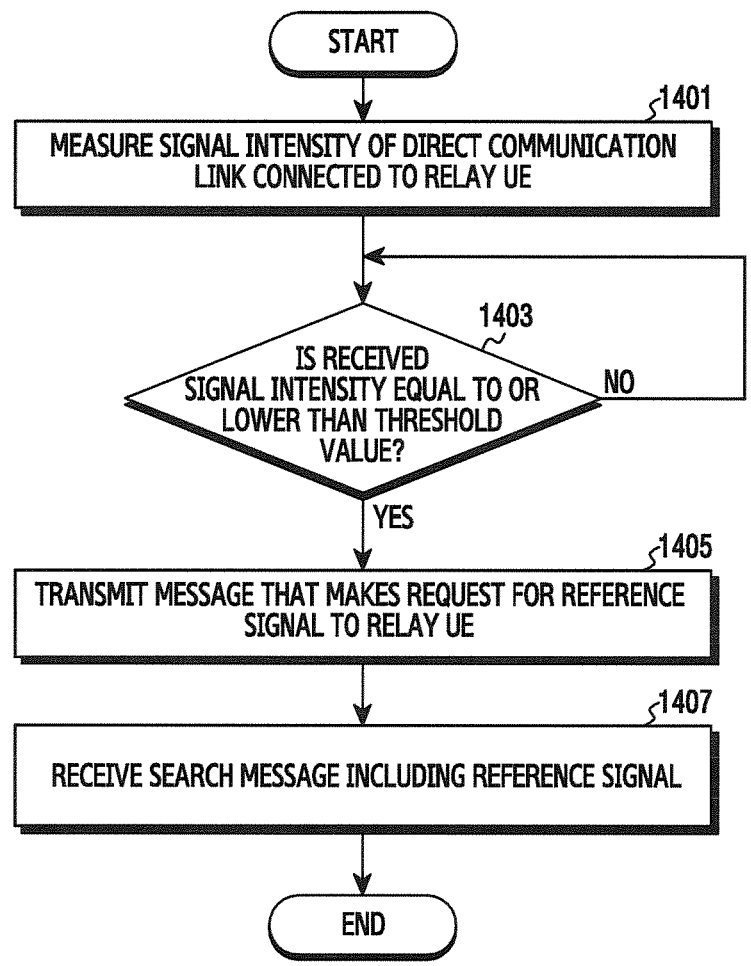
FIG. 14 illustrates the operation of the remote UE according to another embodiment of the present disclosure.

FIG. 14 illustrates the operation of the remote UE according to another embodiment of the present disclosure.

In FIG. 14, the remote UE may measure a signal intensity of a direct communication link connected to the relay UE in step 1401.

The remote UE may determine whether the measured signal intensity is equal to or lower than a threshold value in step 1403.

When the signal intensity is equal to or lower than the threshold value (Yes) in step 1403, the remote UE may transmit a message that makes a request for a reference signal to the relay UE in step 1405. At this time, the reference signal may be a DMRS used for demodulating the signal received from the remote UE.

When the relay UE generates or acquires the reference signal, the remote UE may receive a search message including the reference signal from the relay UE in step 1407.

Figure 15:
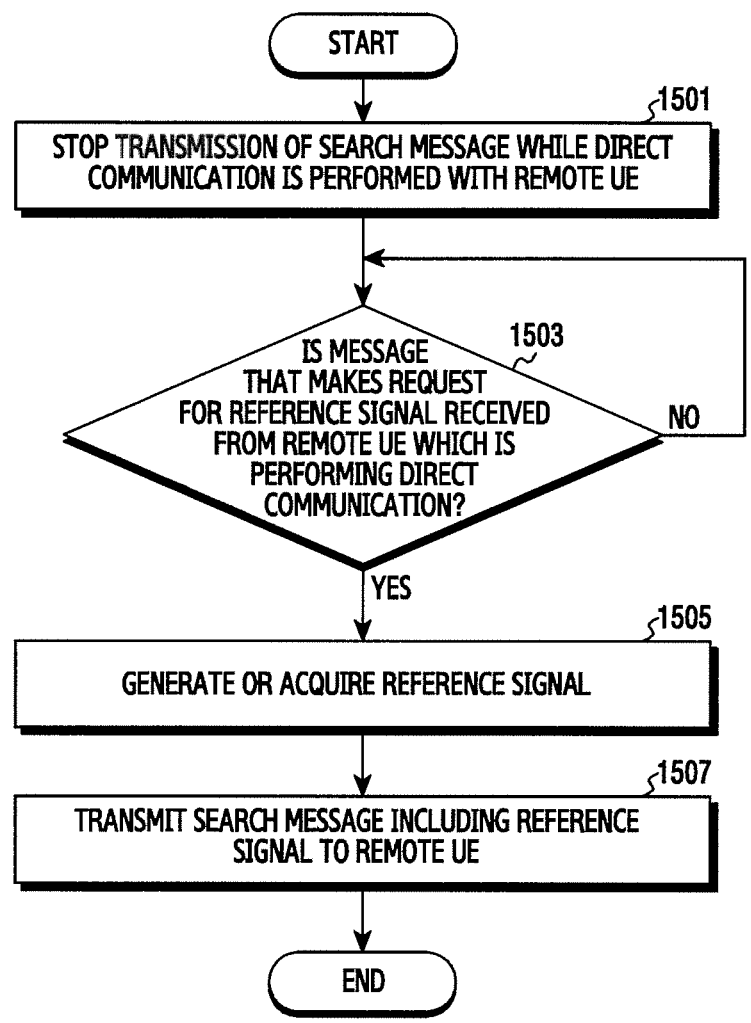
FIG. 15 illustrates the operation or the relay UE according to another embodiment of the present disclosure.

FIG. 15 illustrates the operation of the relay UE according to another embodiment of the present disclosure.

In FIG. 15, the relay UE may stop transmission of the search message while direction communication is performed with the remote UE in step 1501.

The relay UE may determine whether a message that makes a request for a reference signal is received from the remote UE which is performing direct communication in step 1503.

When receiving the message that makes the request for the reference signal (Yes) in step 1503, the relay UE may generate or acquire the reference signal in step 1505.

Next, the relay UE may transmit a search message including the reference signal to the remote UE in step 1507.

According to various embodiments, a method for operating a remote terminal comprises receiving a plurality of search messages from a plurality of relay terminals, identifying at least one relay terminal among the plurality of relay terminals based on the received search messages, transmitting information for indicating the identified at least one relay terminal to a first relay terminal of the plurality of relay terminals, receiving identification information for a second relay terminal from the first relay terminal, and performing relay communication with the second relay terminal.

According to various embodiments, the second relay terminal is identified as an available relay terminal which can provide a relay service with the reomote terminal, based on availability of each of the plurality of relay terminals, among the at least one relay terminal.

According to various embodiments, the availability of a relay terminal is determined based on at least one of an amount of data which the relay terminal can transmit to a base station (BS), a transmission yield of transmission from the relay terminal to the remote terminal, an available buffer capacity of the relay terminal, a number of remote terminals to which the relay terminal can provide the relay communication, or a battery residual quantity. The relay terminal is one of the plurality of relay terminals.

According to various embodiments, the identifying of the at least one relay terminal comprises measuring signal strengths of the received search messages, respectively, and identifying the at least one relay terminal among the plurality of relay terminals according to the measured signal strengths. The identification information for the second relay terminal includes a direct communication reject message indicating that the first relay terminal cannot perform the relay communication.

According to various embodiments, a method for operating a relay terminal, the method comprises broadcasting a search message, receiving information for indicating at least one relay terminal of a plurality of relay terminals having transmitted search messages to the remote terminal, identifying a second relay terminal among the at least one relay terminal, and transmitting identification information for the identified second relay terminal to the remote terminal.

According to various embodiments, the identifying of the second relay terminal comprises transmitting candidate information for indicating the at least one relay terminal to a base station (BS), and receiving the identification information for the second relay terminal from the BS. The second relay terminal is identified by the BS based on availability of each of the plurality of relay terminals.

According to various embodiments, the identifying of the second relay terminal comprises receiving, from the plurality of relay terminals, a plurality of search messages comprising availabilities of the plurality of relay terminals, respectively, and identifying the second relay terminal based on the availabilities of the plurality of relay terminals.

According to various embodiments, the availability of a terminal is determined based on at least one of an amount of data which the relay terminal can transmit to the BS, a transmission yield of transmission from the relay terminal to the remote terminal, an available buffer capacity of the relay terminal, a number of remote terminals to which the relay terminal can provide the relay communication, or a battery residual quantity. The relay terminal corresponds to one of the plurality of relay terminals.

According to various embodiments, the at least one relay terminal is identified by the remote terminal based on signal strengths of the search messages transmitted from the plurality of relay terminals.

According to various embodiments, the method further comprises, when a number of remote terminals connected to the relay terminal is greater than one, determining a remote terminal of which a communication connection will be released based on information for indicating at least one candidate relay terminal received from each of a plurality of remote terminals.

It should be noted that the code configuration diagram, the configuration diagram of the road system, the example diagram of the transmission/reception method, and the example diagram of the signal flow illustrated in FIGS. 1 to 15 are not intended to limit the scope of the present disclosure. That is, all pieces of information, fields, elements, or operation steps illustrated in FIGS. 1 to 15 should not be construed as necessary elements for implementing the present disclosure, and the present disclosure can be implemented by only some of the elements without departing from the scope of the present disclosure.

The above described operations may be implemented by providing a memory device storing a corresponding program code to the entity of the communication system, the function, the base station, the terminal, or any structural element of the vehicle device. That is, the entity, the function, the base station, the terminal, or the controller of the vehicle device carries out the above described operations by reading and executing the program code stored in the memory device by means of a processor or a CPU.

The entity, the function, the base station, the terminal, or various structural elements of the vehicle device, modules and the like may be operated by using a hardware circuit, e.g, a complementary metal oxide semiconductor based logic circuit, firmware, software, and/or a combination of hardware and the firmware and/or software embedded in a machine readable medium. As an example, various electric configurations and methods may be carried out by using electric circuits such as transistors, logic gates, and an application specific integrated circuit (ASIC).

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method performed by a remote terminal, the method comprising:
   receiving a plurality of search messages from a plurality of relay terminals;
   identifying a set of candidate relay terminals among the plurality of relay terminals based on the received plurality of search messages;
   transmitting, to a first relay terminal of the plurality of relay terminals, a first request message including information for indicating the set of candidate relay terminals;

receiving, from the first relay terminal, a first response message including identification information for a second relay terminal of the set of candidate relay terminals, the first response message for indicating a reject for the first request message;

transmitting, to the second relay terminal, a second request message for indicating an isolation state of the remote terminal, wherein the second request message is used to release a connection between another remote terminal and the second relay terminal;

receiving, from the second relay terminal, a second response message for indicating an acceptance for the second request message; and performing a direct communication with the second relay terminal, wherein the second relay terminal is identified among the set of candidate relay terminals, based on an available buffer capacity of each of the set of candidate relay terminals except the first relay terminal.

2. The method of claim 1, wherein the second relay terminal is identified based on:
  an amount of data in a link between a relay terminal and a base station, and
  a transmission yield in a sidelink between the relay terminal and the remote terminal,
wherein the relay terminal is one of the set of candidate relay terminals, and
wherein identifying the set of candidate relay terminals comprises:
measuring a signal strength of each of the received plurality of search messages; and
identifying the set of candidate relay terminals among the plurality of relay terminals according to the measured signal strength.

3. The method of claim 1, wherein the second relay terminal is identified based on a number of remote terminals that can be connected to one relay terminal of the set of candidate relay terminals, and
  wherein the number of remote terminals is determined based on a link quality between the second relay terminal and a base station connected to the second relay terminal.

4. The method of claim 1,
  wherein the isolation state is indicated by the second request message without information for at least one candidate relay terminal, and
  wherein the connection is released based on available resources of the second relay terminal.

5. The method of claim 1,
  wherein the another remote terminal is identified by the second relay terminal based on information for candidate relay terminals, and
  wherein the information for candidate relay terminals is received from at least one remote terminal connected to the second relay terminal.

6. A method performed by a first relay terminal, the method comprising:
  broadcasting a search message;
  receiving, from a remote terminal, a request message;
  if the request message includes candidate information for indicating a set of candidate relay terminals among a plurality of relay terminals having transmitted search messages to the remote terminal, transmitting, to a base station, a first message including the candidate information for indicating the set of candidate relay terminal;

receiving, from the base station, a second message including identification information for indicating a second relay terminal that is identified among the set of candidate relay terminals;

transmitting a first response message including identification information for the second relay terminal to the remote terminal; and if the request message does not include the candidate information and indicates an isolation state of the remote terminal, releasing a connection between another remote terminal and the first relay terminal and transmitting a second response message for indicating an acceptance for the request message to the remote terminal, wherein the first response message indicates a reject for the request message, and wherein the second relay terminal is identified among the set of candidate relay terminals, based on an available buffer capacity of each of the set of candidate relay terminals except the first relay terminal.

7. The method of claim 6, wherein the second relay terminal is identified based on:
  an amount of data in a link between a relay terminal and a base station, and
  a transmission yield in a sidelink between the relay terminal and the remote terminal, and
  wherein the relay terminal corresponds to one of the set of candidate relay terminals, and
  wherein the relay terminal is identified by the remote terminal based on a signal strength of search messages transmitted from the plurality of relay terminals.

8. The method of claim 6, wherein the second relay terminal is identified based on a number of remote terminals that can be connected to one relay terminal of the set of candidate relay terminals, and
  wherein the number of remote terminals is determined based on a link quality between the second relay terminal and a base station connected to the second relay terminal.

9. The method of claim 6,
  wherein the isolation state is indicated by the second request message without information for at least one candidate relay terminal, and
  wherein the connection is released based on available resources of the second relay terminal.

10. The method of claim 6,
  wherein the another remote terminal is identified by the second relay terminal based on information for candidate relay terminals, and
  wherein the information for candidate relay terminals is received from at least one remote terminal connected to the second relay terminal.

11. A remote terminal comprising:
  at least one transceiver; and
  at least one processor operatively coupled to the at least one transceiver,
  wherein the at least one processor is configured to:
  receive a plurality of search messages from a plurality of relay terminals,
  identify a set of candidate relay terminals among the plurality of relay terminals based on the received plurality of search messages,
  transmit, to a first relay terminal of the plurality of relay terminals, a first request message including information for indicating the set of candidate relay terminals,
  receive, from the first relay terminal, a first response message including identification information for a second relay terminal of the set of candidate relay terminals, the first response message for indicating a reject for the first request message, transmitting, to the second relay terminal, a second request message for indicating an isolation state of the remote terminal, wherein the second request message is used to release a connection between another remote terminal and the second relay terminal, receiving, from the second relay terminal, a second response message for indicating an acceptance for the second request message, and perform a direct relay communication with the second relay terminal, wherein the second relay terminal is identified among the set of candidate relay terminals, based on an available buffer capacity of each of the set of candidate relay terminals except the first relay terminal.

12. The remote terminal of claim 11, wherein the second relay terminal is identified based on:
an amount of data in a link between a relay terminal and a base station, and
a transmission yield in a sidelink between the relay terminal and the remote terminal, and
wherein the relay terminal is one of the set of candidate relay terminals,
wherein the at least one processor is, in order to identify the set of candidate relay terminals, configured to:
measure a signal strength of each of the received search messages, and
identify the set of candidate relay terminals among the plurality of relay terminals according to the measured signal strength.

13. The remote terminal of claim 11, wherein the second relay terminal is identified based on a number of remote terminals that can be connected to one relay terminal of the set of candidate relay terminals, and
wherein the number of remote terminals is determined based on a link quality between the second relay terminal and a base station connected to the second relay terminal.

14. The remote terminal of claim 11,
wherein the isolation state is indicated by the second request message without information for at least one candidate relay terminal, and
wherein the connection is released based on available resources of the second relay terminal.

15. The remote terminal of claim 11,
wherein the another remote terminal is identified by the second relay terminal based on information for candidate relay terminals, and
wherein the information for candidate relay terminals is received from at least one remote terminal connected to the second relay terminal.

16. A first relay terminal comprising:
at least one transceiver; and
at least one processor operatively coupled to the at least one transceiver,
wherein the at least one processor is configured to:
broadcast a search message,
receive, from a remote terminal, a request message, if the request message includes candidate information for indicating a set of candidate relay terminals among a plurality of relay terminals having transmitted search messages to the remote terminal, transmit, to a base station, a first message including the candidate information for indicating the set of candidate relay terminal, receive, from the base station, a second message including identification information for indicating a second relay terminal that is identified among the set of candidate relay terminals, transmit a first response message including identification information for the second relay terminal to the remote terminal, and if the request message does not include the candidate information and indicates an isolation state of the remote terminal, release a connection between another remote terminal and the first relay terminal and transmit a second response message for indicating an acceptance for the request message to the remote terminal, wherein the first response message indicates a reject for the request message, and wherein the second relay terminal is identified among the set of candidate relay terminals, based on an available buffer capacity of each of the set of candidate relay terminals except the first relay terminal.

17. The first relay terminal of claim 16, wherein the second relay terminal is identified based on:
an amount of data in a link between a relay terminal and a base station, and
a transmission yield in a sidelink between the relay terminal and the remote terminal,
wherein the relay terminal corresponds to one of the set of candidate relay terminals, and
wherein at least one relay terminal is identified by the remote terminal based on a signal strength of each message transmitted from the plurality of relay terminals.

18. The first relay terminal of claim 16, wherein the second relay terminal is identified based on a number of remote terminals that can be connected to one relay terminal of the set of candidate relay terminals, and
wherein the number of remote terminals is determined based on a link quality between the second relay terminal and a base station connected to the second relay terminal.

19. The first relay terminal of claim 16,
wherein the isolation state is indicated by the second message without information for at least one candidate relay terminal, and
wherein the connection is released based on available resources of the second relay terminal.

20. The first relay terminal of claim 16,
wherein the another remote terminal is identified by the second relay terminal based on information for candidate relay terminals, and
wherein the information for candidate relay terminals is received from at least one remote terminal connected to the second relay terminal.

* * * * *